United States Patent
Hay

[19]

[11] Patent Number: 5,973,317
[45] Date of Patent: Oct. 26, 1999

[54] WASHER HAVING FIBER OPTIC BRAGG GRATING SENSORS FOR SENSING A SHOULDER LOAD BETWEEN COMPONENTS IN A DRILL STRING

[75] Inventor: Arthur D. Hay, Cheshire, Conn.

[73] Assignee: CiDRA Corporation, Wallingford, Conn.

[21] Appl. No.: 08/853,762

[22] Filed: May 9, 1997

[51] Int. Cl.[6] ............................. G01B 9/00; G01B 11/16; H01J 5/00
[52] U.S. Cl. .................. 250/227.14; 250/227.18; 250/227.19; 250/227.23; 385/12; 356/345; 73/800
[58] Field of Search .................... 250/227.14, 227.15, 250/227.16, 227.18, 227.21, 227.23, 227.27, 231.1, 231.19; 356/35.5, 345; 385/12, 13, 37; 73/800, 761, 768, 796

[56] References Cited

U.S. PATENT DOCUMENTS

| | | |
|---|---|---|
| 4,761,073 | 8/1988 | Meltz et al. . |
| 4,806,012 | 2/1989 | Meltz et al. . |
| 4,950,883 | 8/1990 | Glenn . |
| 4,996,419 | 2/1991 | Morey . |
| 5,308,973 | 5/1994 | Odoni et al. . |
| 5,339,696 | 8/1994 | Carignan . |
| 5,361,130 | 11/1994 | Kersey et al. . |
| 5,401,956 | 3/1995 | Dunphy et al. . |
| 5,426,297 | 6/1995 | Dunphy et al. . |
| 5,444,803 | 8/1995 | Kim et al. . |
| 5,451,772 | 9/1995 | Narendran . |
| 5,452,087 | 9/1995 | Taylor et al. . |
| 5,493,113 | 2/1996 | Dunphy et al. . |
| 5,493,390 | 2/1996 | Varasi et al. . |
| 5,495,892 | 3/1996 | Carisella . |
| 5,507,341 | 4/1996 | Eslinger et al. . |
| 5,513,913 | 5/1996 | Ball et al. . |
| 5,529,346 | 6/1996 | Sperring . |
| 5,564,504 | 10/1996 | Carisella . |
| 5,564,832 | 10/1996 | Ball et al. ........................ 250/227.14 |
| 5,675,674 | 10/1997 | Weis ....................................... 385/12 |
| 5,723,857 | 3/1998 | Underwood et al. ............. 250/227.14 |

*Primary Examiner*—Edward P. Westin
*Assistant Examiner*—John R. Lee
*Attorney, Agent, or Firm*—Ware, Fressola, Van Der Sluys & Adolphson LLP

[57] ABSTRACT

The present invention features an apparatus for detecting a shoulder load between two components in a drill string, comprising a pin connection, a box connection and a washer for sensing tensioning strain force therebetween. The pin connection has coupling means, and the box connection has corresponding coupling means for coupling to the pin connection to form a drill string. The washer is arranged between the pin connection and the box connection. The washer has embedded fiber optic Bragg Grating sensors that respond to a compressive strain shoulder load force when the pin connection is coupled to the box connection, and further responds to a light signal, for providing a compressive strain shoulder load force light signal containing information about a sensed compressive strain shoulder load force between the pin connection and the box connection in the drill string. The fiber optic Bragg Grating sensor may include either a Bragg Grating single point sensor, multiple Bragg Gratings, or a lasing element formed with pairs of multiple Bragg Gratings.

24 Claims, 9 Drawing Sheets

ROTARY SHOULDERED CONNECTION
LOCATION OF DIMENSIONS
FOR
BENDING STRENGTH RATIO CALCULATIONS
<u>WITH WASHER ADDED</u>

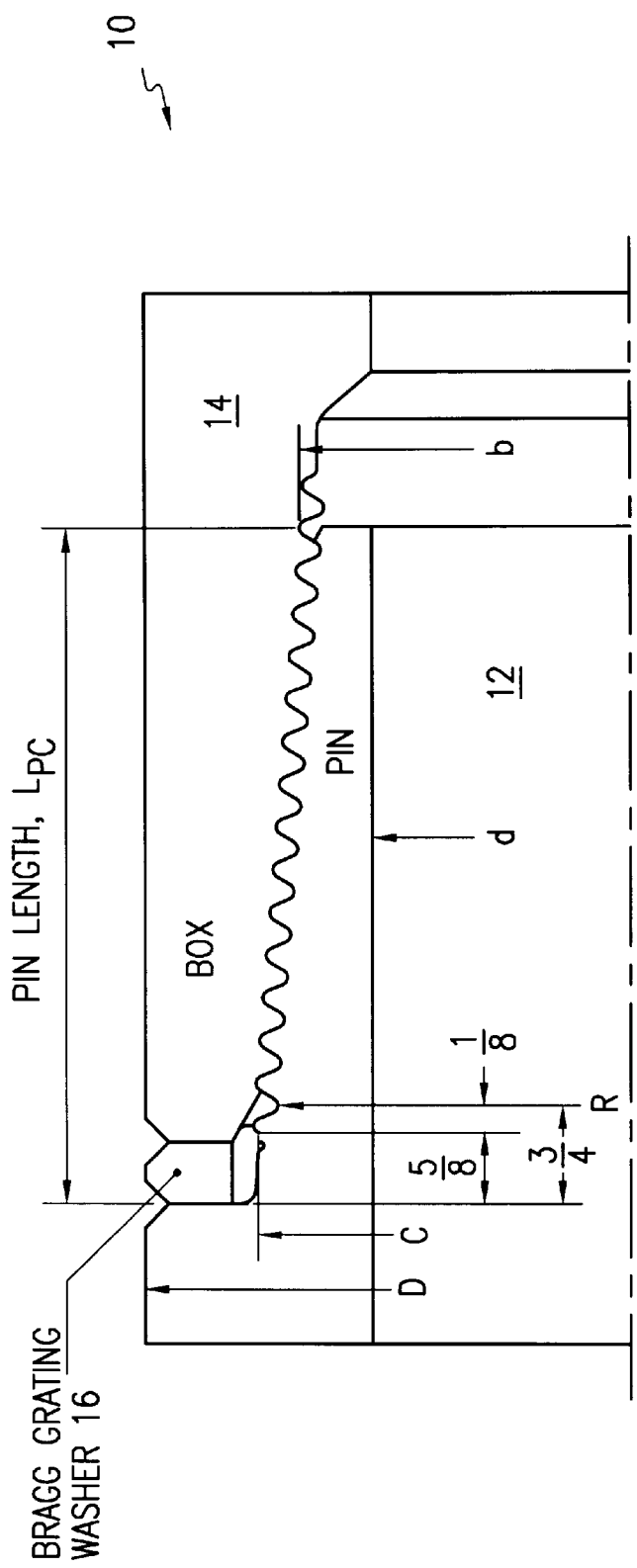

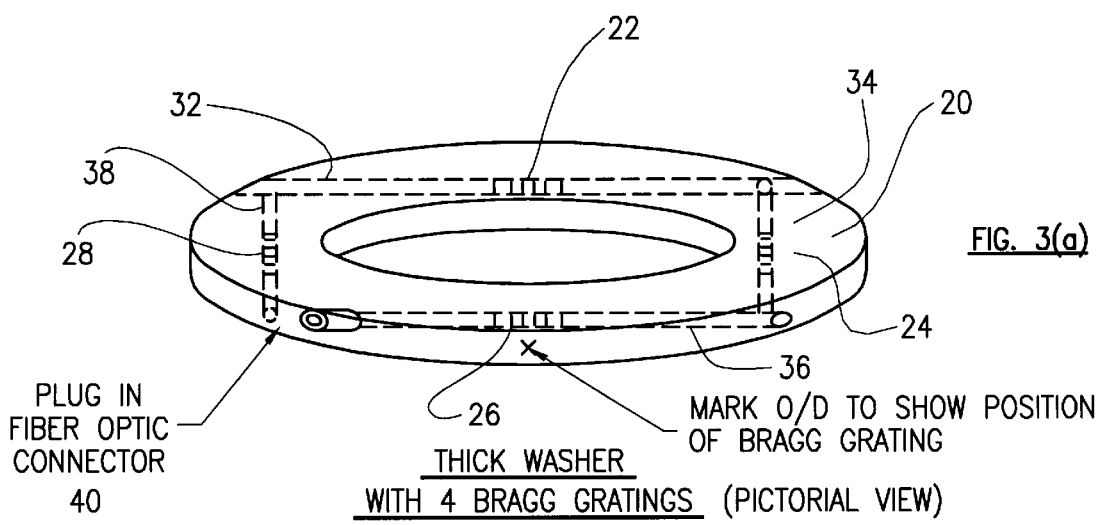

PLUG IN FIBER OPTIC CONNECTOR 40

THICK WASHER WITH 4 BRAGG GRATINGS (PICTORIAL VIEW)

MARK O/D TO SHOW POSITION OF BRAGG GRATING

FIG. 3(a)

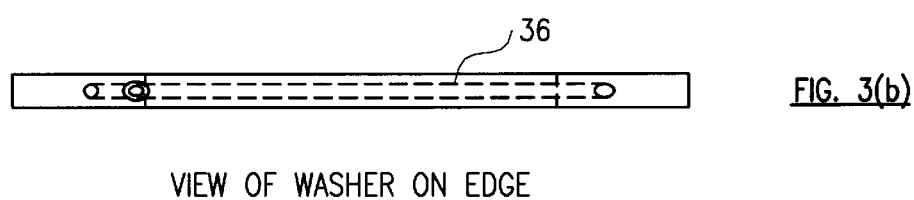

VIEW OF WASHER ON EDGE

FIG. 3(b)

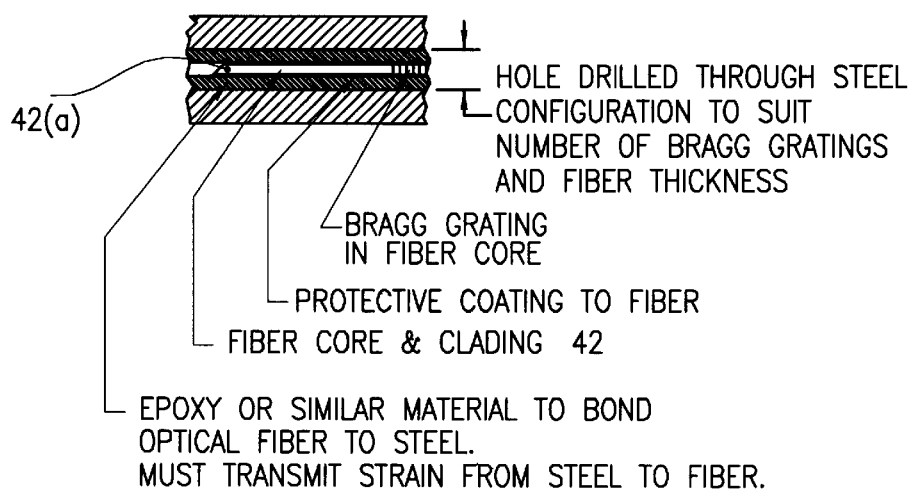

HOLE DRILLED THROUGH STEEL
CONFIGURATION TO SUIT NUMBER OF BRAGG GRATINGS AND FIBER THICKNESS

BRAGG GRATING IN FIBER CORE

PROTECTIVE COATING TO FIBER

FIBER CORE & CLADDING 42

EPOXY OR SIMILAR MATERIAL TO BOND OPTICAL FIBER TO STEEL. MUST TRANSMIT STRAIN FROM STEEL TO FIBER. 30

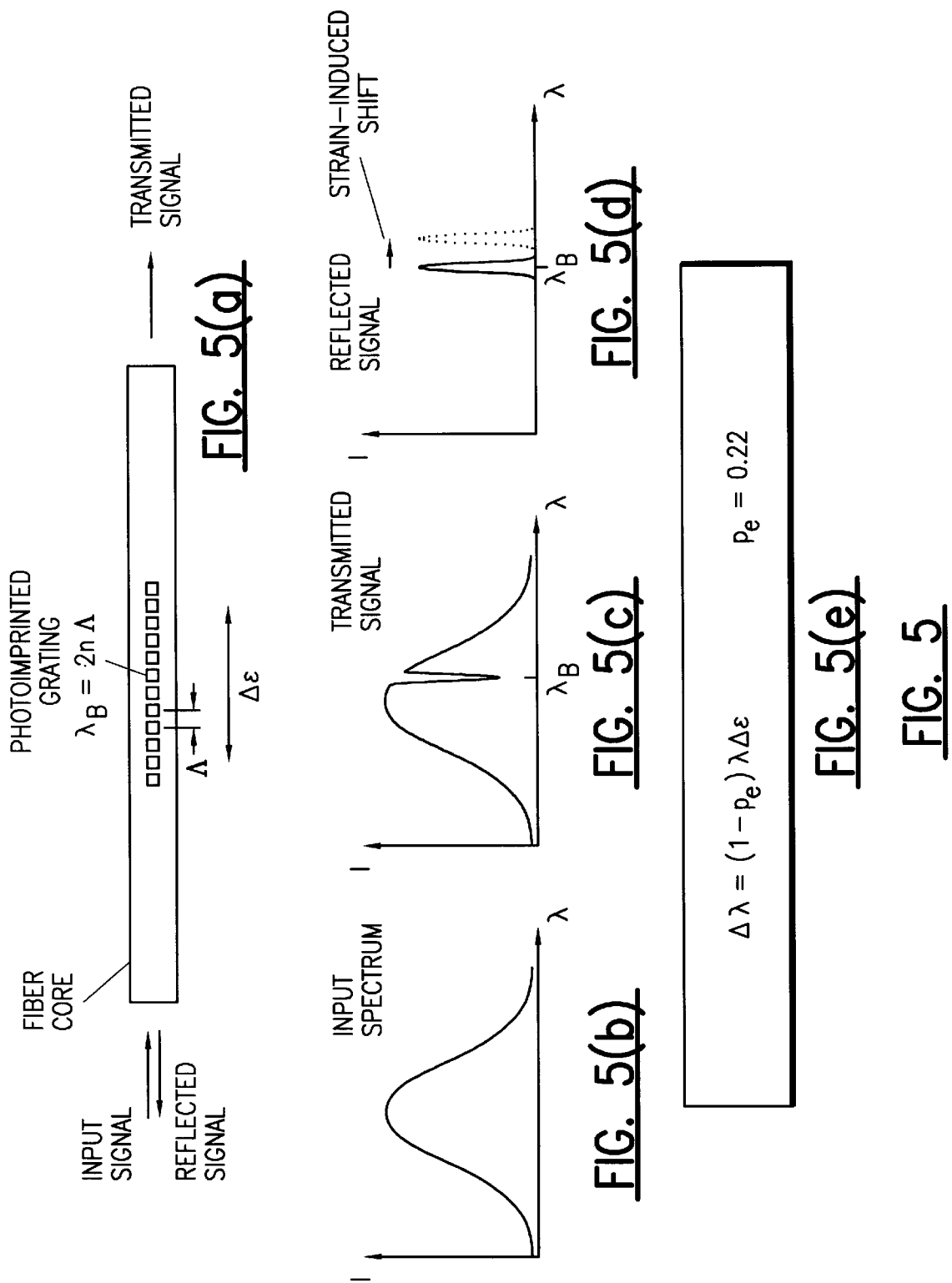

Wavelength Division Multiplexing
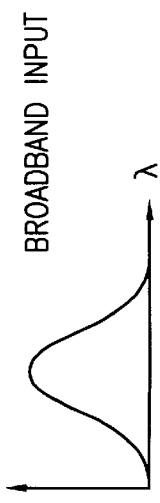
FIG. 6(b)
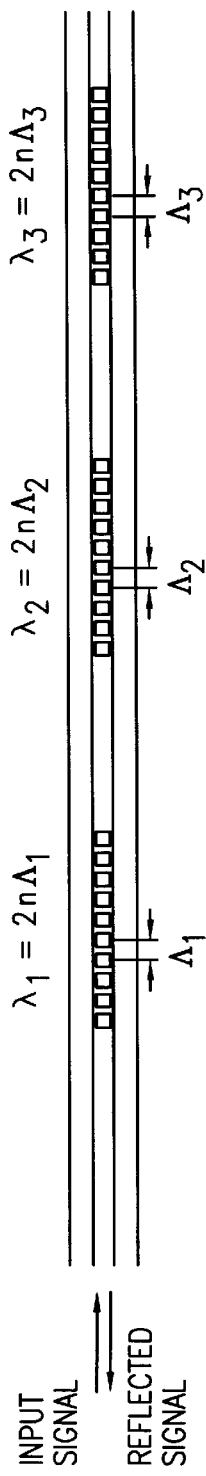
FIG. 6(a)
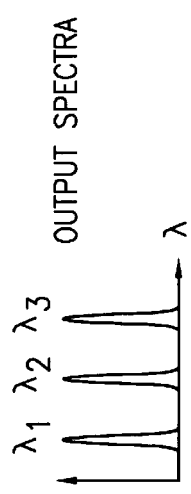
FIG. 6(c)
FIG. 6

5,973,317

WASHER HAVING FIBER OPTIC BRAGG GRATING SENSORS FOR SENSING A SHOULDER LOAD BETWEEN COMPONENTS IN A DRILL STRING

TECHNICAL FIELD

The present invention relates to equipment for drilling a well, such as a gas or oil well; and more particularly, relates to a drill string for such drilling equipment.

BACKGROUND OF INVENTION

In the extraction of oil from sub-surface reservoirs, it is necessary to drill a borehole, or indeed several bore holes, in order to access the reservoir. Using current technology, the practice is to drill highly deviated wells, or indeed drill the well in the area of the reservoir horizontal to the access of a main borehole. This involves bending a drill string in the desired direction by adjusting a weight on a bit and by using an individual or combination of devices that adjust the fulcrum point between the bit and that point. Such methods result in a controlled bowing or bending of the drill string. Because the drill string is made of individual lengths of collars, drill bits or specialty tools held together by specially configured American Petroleum Institute (API) or industry proprietary connections, the stress at the connections is dependent upon the respective connection shoulder interface loading. By torquing up the respective drill string pieces relative to each other, the interface loading on the connection shoulder is roughly controlled. This torque measurement is influenced by the thread profile, the type of lubricant used, the calibration of torque readouts, etc. As a result the actual connection shoulder load is never exactly known. See FIG. 1.

During the controlled bowing or bending of the drill string that occurs during directional drilling, the shoulder interface can become unloaded sufficiently to allow the drilling mud, which is circulated at high pressure down through the drill string, to leak through the connection/shoulder into the annulus. Prolonged leakage leads to mud jet cutting, and possibly a washout. If the connection is sufficiently weakened, the drill strings can no longer transmit the torque or carry the weight, and a twistoff may occur. Similarly, if the drill string is rotating, the connection can fatigue due to cyclical stressing of the pin due to bending.

Known techniques for dealing with the above referenced problem associated with drilling in various directions currently relies on the basic principle that the thread profile of both box and pin are accurately machined to be defined API or proprietary thread profile and that thread dope (lubricant) is properly applied. The torque is applied via pulling systems (either hydraulic or winch activated) acting via tong levers which are secured to the respective pieces of the drill string that have to be tightened. The torquing system pulls the tongs in opposing directions radially to the axis of the drill string. The applied torque is calculated to have been applied when hydraulic or strain gauge type readouts, on the torquing system, reach precalculated values. Mechanical spinner systems work on a similar principle although the method of applying the torque may be distributed over a longer section of the drill string.

There are significant problems associated with existing methods of monitoring the torque in such connections. Because most oil-field threads that hold drill string components together are tapered, the ability to apply the correct shoulder load is directly proportional to the thread profile of the mating parts as well as the coefficient of friction. In either case, if the taper is too shallow or extreme, the shoulder load is either too low or too high. Similarly, if the thread lubricant results in too low a coefficient of friction, then there is a high shoulder load and a possible stretched pin. Alternatively, if the thread lubricant has too high a coefficient of friction, then the shoulder load will be too low.

SUMMARY OF INVENTION

The present invention has the object of providing a highly accurate method of determining the shoulder load between components in a drill string, or bottom hole assembly.

The present invention features an apparatus for detecting a shoulder load between two components in a drill string, comprising a pin connection, a box connection and a tension or compressive strain force sensing means in the form of a Bragg Grating washer 16.

The pin connection has coupling means, and the box connection has corresponding coupling means for coupling to the pin connection to form a section of a drill string. The tension or compressive strain force sensing means is arranged between the pin connection and the box connection. The tension or compressive strain force sensing means responds to a compressive strain shoulder load force when the pin connection is coupled to the box connection, and further responds to a light signal, for providing a compressive strain shoulder load force light signal containing information about a sensed compressive strain shoulder load force between the pin connection and the box connection in the drill string.

In one embodiment, the tension or compressive strain force sensing means includes a washer, a fiber optic Bragg Grating sensor and means for bonding. The washer has one or more bores drilled into it each with an inner wall surface. The fiber optic Bragg Grating sensor is arranged inside said bore. The means for bonding, such as an epoxy, bonds the fiber optic Bragg Grating sensor inside the bore to the material of the inner wall surface of the washer so the compressive strain shoulder load force applied to the washer when the pin connection is coupled to the box connection is substantially transferred to the fiber optic Bragg Grating sensor.

The fiber optic Bragg Grating sensor may include either a Bragg Grating point sensor, multiple Bragg Gratings, or a lasing element formed with pairs of multiple Bragg Gratings.

One advantage of the present invention is that the strain shoulder load force light signal provides a reading that eliminates the variables of geometry and coefficient of friction and allows a direct measurement of the shoulder interface load. Another advantage lies in the fact that the present invention provides an intrinsically safe indicator that can be used directly over the borehole, in the presence of gas. Strategic placement and configuration of the Bragg Gratings within the washer would also allow the user to determine the uniformity of loading and therefore detect conditions where the respective shoulders were not parallel or were otherwise uneven. There is no concern about damage to the sensors from relative rotation of the parts because these sensors are imbedded within the washer.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

FIG. 2 is a diagram of a rotary shouldered connection of a drill string having a washer for sensing shoulder load between components.

FIG. 3 includes FIGS. 3(a), 3(b) and 3(c).

FIGS. 3(a) is a perspective view of a washer that is the subject matter of the present invention.

FIG. 3(b) is an edge view of the washer shown in FIG. 3(a).

FIG. 3 (c) is a diagram of a cross-section of the washer shown in FIG. 3(a).

FIG. 5 includes FIGS. 5(a), (b), (c), (d) and (e).

FIG. 5(a) is an illustration of a photo-imprinted Bragg Grating sensor.

FIG. 5(b) is a graph of a typical spectrum of an input signal to the photo-imprinted Bragg Grating sensor in FIG. 5(a).

FIG. 5(c) is a graph of a typical spectrum of a transmitted signal from the photo-imprinted Bragg Grating sensor in FIG. 5(a).

FIG. 5(d) is a graph of a typical spectrum of a reflected signal from the photo-imprinted Bragg Grating sensor in FIG. 5(a).

FIG. 5(e) is an equation for the change of wavelength.

FIG. 6 includes FIGS. 6(a), (b) and (c) relating to wavelength division multiplexing of Bragg Grating sensors.

FIG. 6(a) is an illustration of a series of three Bragg Grating sensors.

FIG. 6(b) is a graph of a typical broadband input spectrum to the photo-imprinted Bragg Grating sensors in FIG. 6(a).

FIG. 6(c) is a graph of an output spectrum of a reflected signal from the photo-imprinted Bragg Grating sensors in FIG. 6(a).

FIG. 8(a) shows interferometric decoding of a Bragg Grating sensor.

FIG. 8(b) is a graph of output spectra of a wavelength encoded return signal from the Bragg Grating sensor in FIG. 7(a).

FIG. 8(c) is an equation for determining a wavelength shift transposed to a phase shift via interferometric processing of the wavelength encoded reflected signal shown in FIG. 7(b).

DETAILED DESCRIPTION OF THE INVENTION

Figure 1:
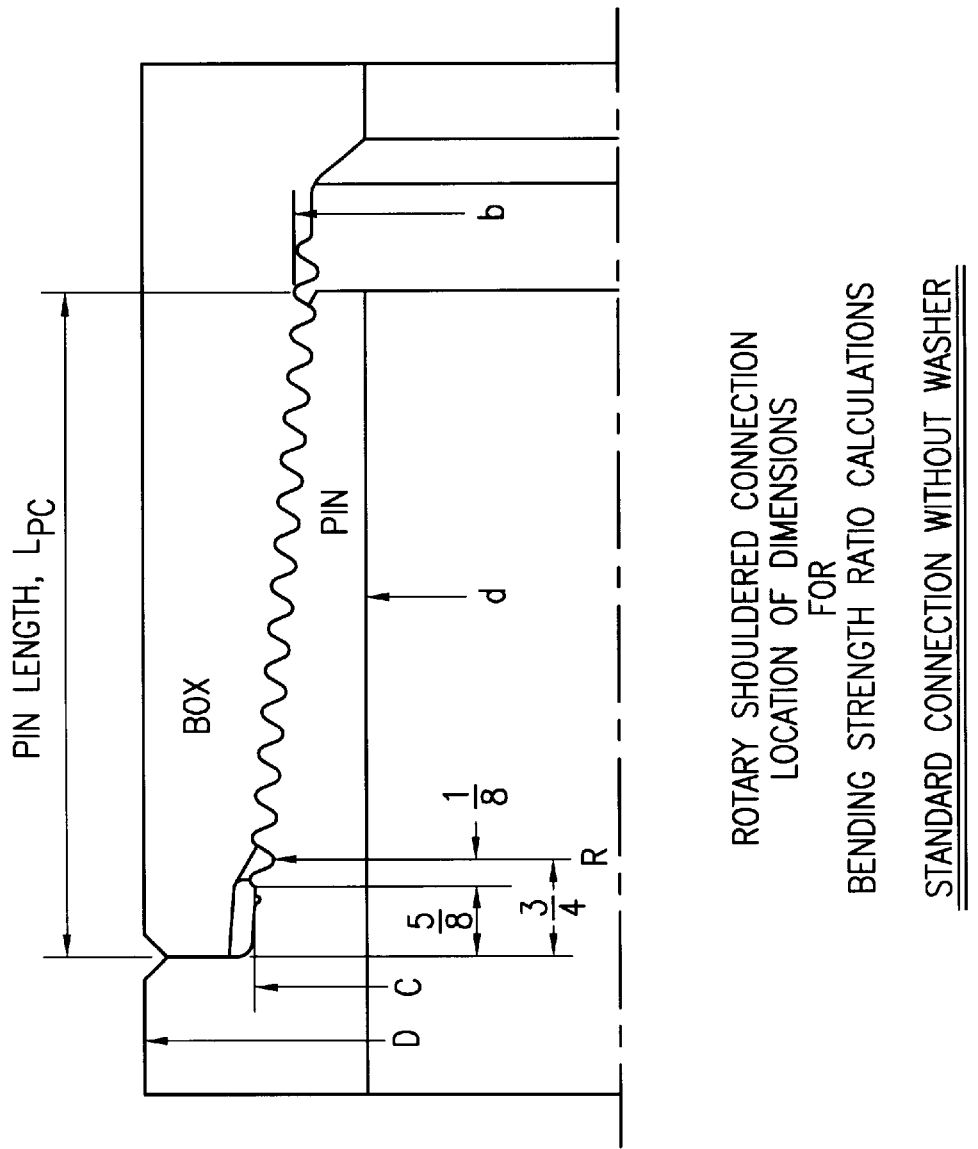
FIG. 1 is a diagram of a rotary shouldered connection of a drill string that is known in the prior art.
Figure 4:
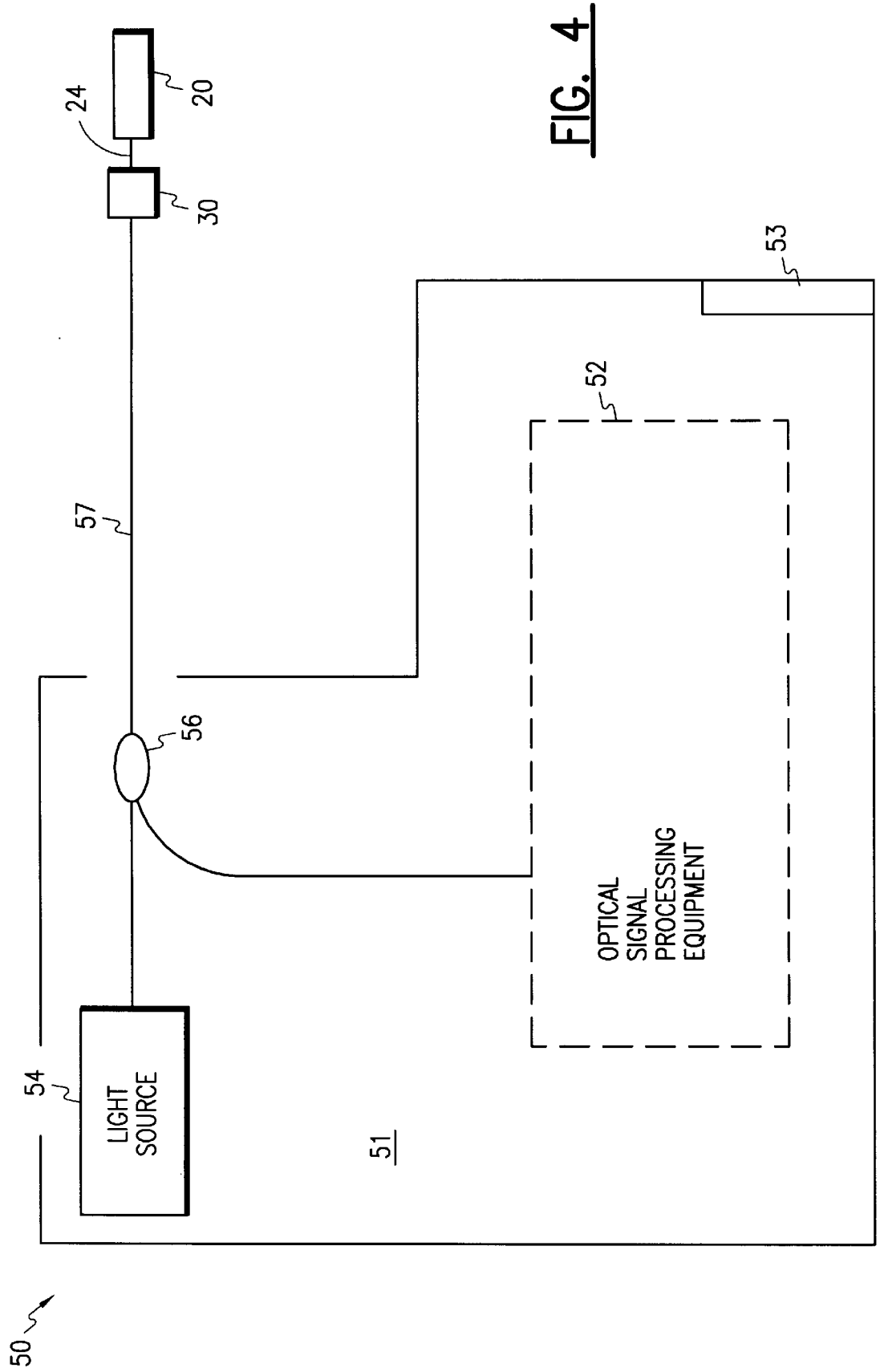
FIG. 4 is a diagram of the signal processing circuitry to be used with the present invention.
Figure 7:
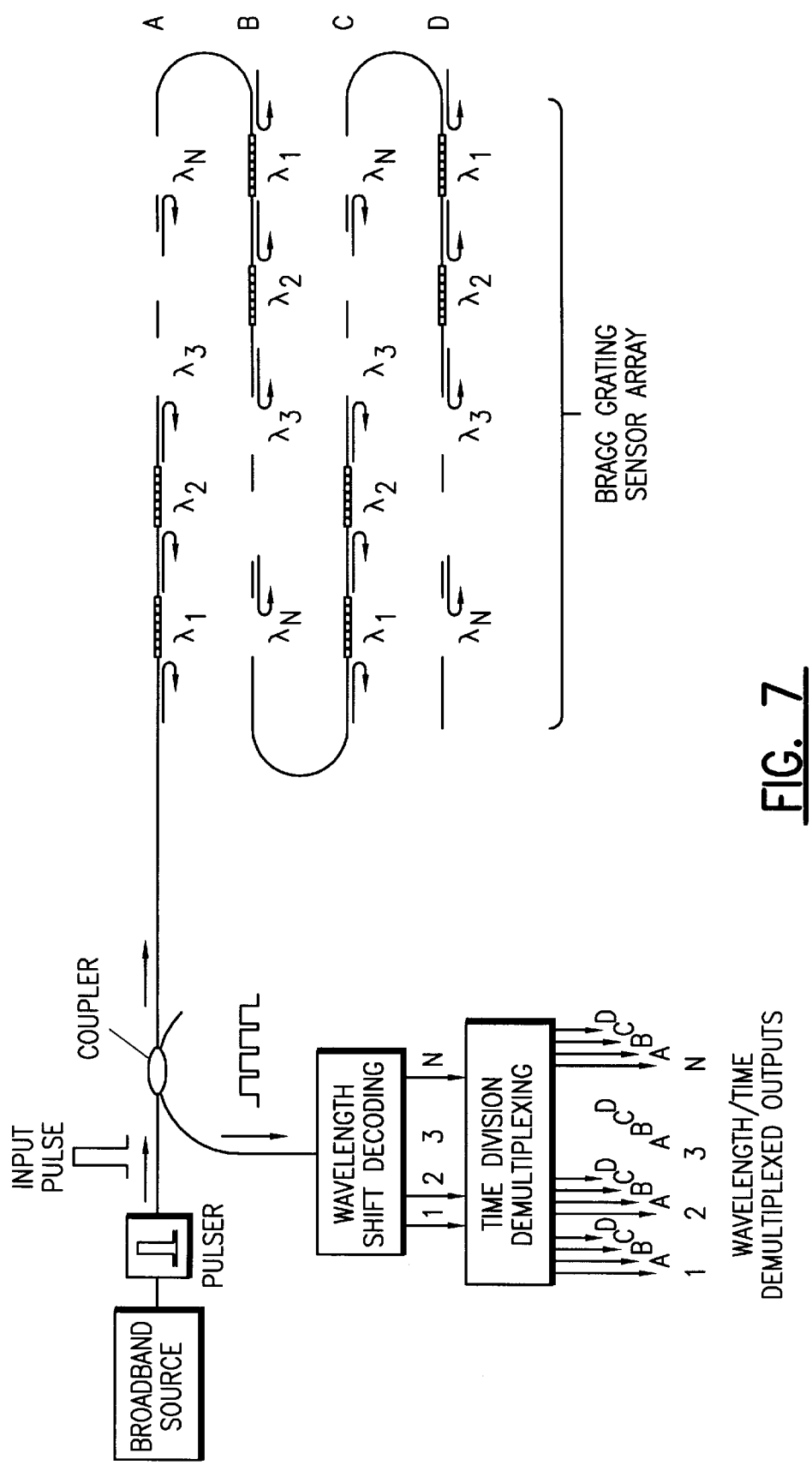
FIG. 7 is a time/wavelength division multiplexed Bragg Grating sensor array.
Figure 8:
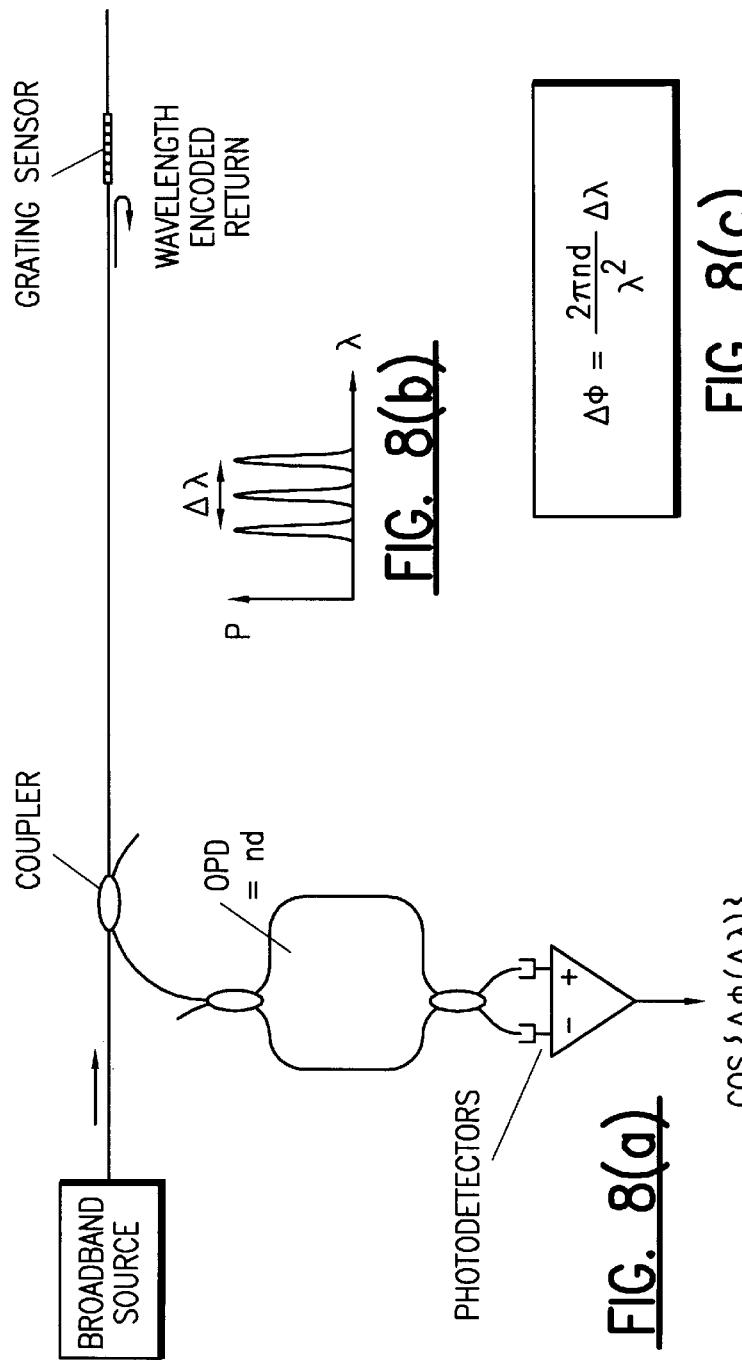
FIG. 8 includes FIGS. 8(a), (b) and (c).
Figure 9:
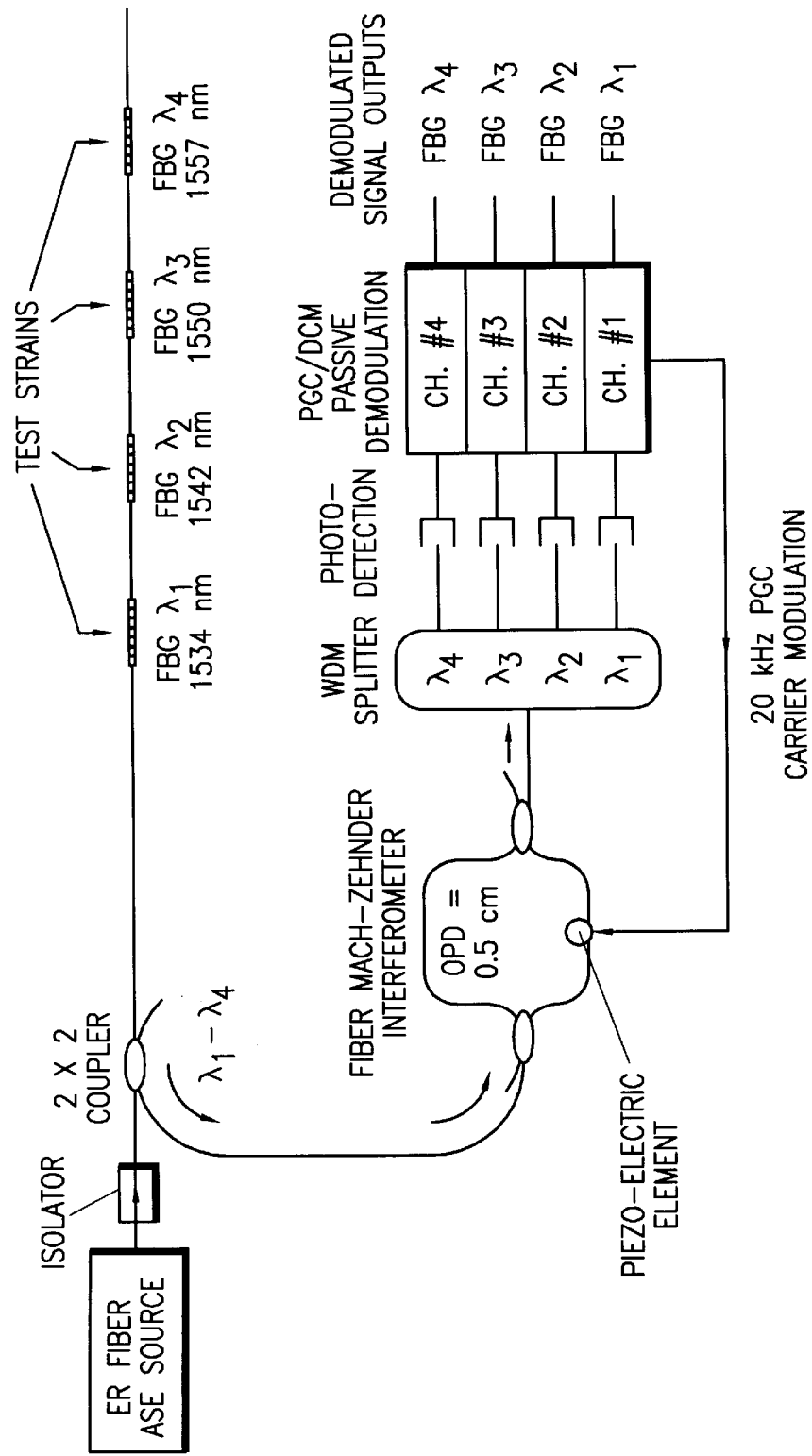
FIG. 9 shows an interferometrically decoded Bragg Grating sensor system.

Referring now to FIG. 2, the present invention features an apparatus generally indicated as 10 for detecting a shoulder load between two components in a drill string (not shown), comprising a pin connection generally indicated as 12, a box connection generally indicated as 14, and a tension or compressive strain force sensing means generally indicated as 16 and shown in FIG. 2 in the form of a Bragg Grating washer 16.

The pin connection 12 has coupling means, such as threads 18. The box connection 14 has corresponding coupling means, such as corresponding threads 20, for coupling to the pin connection 12 to form the drill string (not shown). The tensioning strain force sensing means 16 is arranged between the pin connection 12 and the box connection 14. The Bragg Grating washer 16 responds to a compressive strain shoulder load force when the pin connection 12 is coupled to the box connection 14, and further responds to a light signal, as discussed below, for providing a tensioning strain shoulder load force light signal containing information about a sensed compressive strain shoulder load force between the pin connection 12 and the box connection 14 in the drill string (not shown).

Referring now to FIGS. 3(a), 3(b), 3(c), in one embodiment the Bragg Grating washer 16 includes a washer 20, four fiber optic Bragg Grating sensors 22, 24, 26, 28 and means for bonding, such as an epoxy generally indicated as 30 shown in FIG. 3(c). The washer 20 has four bores generally indicated as 32, 34, 36, 38 with a respective inner wall surface. The respective fiber optic Bragg Grating sensors 22, 24, 26, 28 area arranged inside the bores 32, 34, 36, 38. The epoxy 30 bonds the fiber optic Bragg Grating sensors 22, 24, 26, 28 inside the bores 32, 34, 36, 38 to the material of the inner wall surface of the washer 20 so the compressive strain shoulder load force applied to the washer 20 when the pin connection 12 is coupled to the box connection 14 is substantially transferred to the respective fiber optic Bragg Grating sensors 22, 24, 26, 28. The scope of the invention is not intended to be limited to any particular number of fiber optic Bragg Grating sensors, the placement thereof in the washer 20, or the dimensions shown in FIG. 2.

The washer 20 is made of compressible material, of suitable thickness such that it will not distort beyond yield point when subjected to loading during drilling. As shown in FIG. 3(b), the washer 20 is drilled internally, without interconnecting the internal to external diameters, in a predetermined configuration to accommodate a desired number and placement of the respective fiber optic Bragg Grating sensors ;22, 24, 26, 28 on a fiber optic filament 42 shown in FIG. 3(c). The drilling can also accommodate a provision for a fiber optic connector 40, if necessary, to make the washer reusable. As shown in FIG. 3(c), the fiber 42 is installed into a predrilled hole configuration and epoxied in place such that the Bragg gratings are at predetermined positions within the washer 20.

The invention is described as using fiber Bragg gratings as sensors, which are known in the art. The Bragg Gratings may be a point sensor, and it should be understood that any suitable Bragg grating sensor configuration may be used. For example, the Bragg Gratings can be used with interferometric detection. Alternatively, the Bragg Gratings may be used to form lazing elements for detection, for example by positioning an Ebrium doped length of optical fiber between a pair of Bragg gratings. It will also be understood by those skilled in the art that the present invention will work equally as well with other types of Bragg Grating sensors. The benefits of the present invention are realized due to improved sensitivity of transmission of force fluctuations to the sensors via the high density, low compressibility material.

In FIG. 3(c), a distal end 42(a) of fiber 42 is terminated in an anti-reflective manner, so as to prevent interference with the reflected wavelengths from the optic fiber Bragg Gratings sensors 22, 24, 26, 28. For example, the distal end 42(a) of the fiber 42 may be cleaved at an angle, as shown in FIG. 3(c) so that the end face is not perpendicular to the fiber axis. Alternatively, the distal end 42(a) may be coated with a material that matches the index of refraction of the fiber, thus permitting light to exit the fiber without back reflection, and be subsequently disbursed in the index-matching material.

The Signal Processing Circuitry

A person skilled in the art would appreciate how the optic fiber Bragg Grating sensors 22, 24, 26, 28 are used as sensor elements. The reader is generally referred to FIGS. 4–9, which would be appreciated by a person skilled in the art. In general, a data acquisition unit comprising a broadband light source or laser diode with suitable photo optic couplers, demodulators and filtering equipment can be used to monitor the Bragg grating wavelength shift as the grating is subjected to strain. If more than one grating is used, wave division multiplexing techniques can be utilized to discriminate the value or change in wavelength of each individual Bragg grating. The fiber optic connection between the acquisition unit and the washer is simply a length of fiber, and the actual decoding can be performed in a safe area if necessary. A readout device can be positioned so that a continuous reading of strain can be provided.

When such a fiber grating is illuminated, it reflects a narrow band of light at a specified wavelength. However, a measurand, such as strain induced by pressure or temperature, will induce a change in the fiber grating spacing, which changes the wavelength of the light it reflects. The value (magnitude) of the measurand is directly related to the wavelength reflected by the fiber grating and can be determined by detecting the wavelength of the reflected light.

Referring now to FIG. 3, by way of a brief description, an example of signal processing circuitry is shown and generally indicated as 50 that may be used in conjunction with the present invention. The direct strain readout box generally indicated as 51 includes an optical signal processing equipment 52, a broadband source of light 54, such as the light emitting diode (LED), and appropriate equipment such as a coupler 56, a fiber lead 57 and the external connector 30 for delivery of signal light to the Bragg Grating sensor 20 (FIG. 1) included within the core of the optical fiber 24. The broadband source of light 54 provides an optical signal to the Bragg Grating sensors 22, 24, 26, 28, where it is reflected and returned to the direct strain readout box 51 as a return light signal. The optical coupler 56 provides the return light signal to the optical signal processing equipment 52 for analysis. The scope of the invention is not intended to be limited to any specific embodiment of the optical signal processing equipment 52. The Bragg Grating washer 20 may also be continuously monitored with the appropriate optical signal processing equipment. Other optical signal analysis techniques may be used with the present invention such as the necessary hardware and software to implement the optical signal diagnostic equipment disclosed in U.S. Pat. Nos. 4,996,419; 5,361,130; 5,401,956; 5,426,297; and/or 5,493,390, all of which are hereby incorporated by reference.

As is well known in the art, there are various optical signal analysis approaches which may be utilized to analyze return signals from Bragg gratings. These approaches may be generally classified in the following four categories:

1. Direct spectroscopy utilizing conventional dispersive elements such as line gratings, prisms, etc., and a linear array of photo detector elements or a CCD array.
2. Passive optical filtering using both optics or a fiber device with wavelength-dependent transfer function, such as a WDM coupler.
3. Tracking using a tuneable filter such as, for example, a scanning Fabry-Perot filter, an acousto-optic filter such as the filter described in the above referenced U.S. Pat. No. 5,493,390, or fiber Bragg Grating based filters.
4. Interferometric detection. The particular technique utilized will vary, and will depend on the Bragg wavelength shift magnitude (which depends on the sensor design) and the frequency range of the measurand to be detected.

Basic Operation

In operation, the washer 20 is placed between respective interfaces components such as the pin connection 12 and the box connection 14 and the assembly is prepared and torqued up using standard techniques, i.e., torque machines, torque wrenches, tongs, etc. As the interface comes in direct contact, the strain reading of the washer 20 will be displayed on the data acquisition display. By knowing the mechanical properties of the washer material, this strain can be directly converted to interface loading or stress. Wave division multiplexing techniques allow multiple readouts to be made and displayed, such that a map of the loading on the respective interface can be shown. Such information can also be directed to a computer and used to verify Finite Element Analysis of the washer under loading.

The configuration of the washer can be such that the fiber runs directly from the washer to the data acquisition display in a continuous run, or it can be unplugged at the washer. If continuous, the fiber can be broken off once the desired interface load has been applied.

The present invention can be utilized between any mating surfaces where the interface loading or stress is required to be controlled. Additionally, the present invention is applicable to any equipment where the interface loading is required to be monitored over time to determine if there has been a change in status.

Temperature Compensation

Due to various non-linear effects associated with materials, construction, etc., and to geometrical, tolerance, and other variations which occur during manufacturing and assembly, linear temperature compensation alone may not be sufficient to produce a linear sensor. Therefore the device may be further characterized over temperature, allowing a correction of output for temperature by means of curve fitting, look-up table, or other suitable means.

Although the invention has been described and illustrated with respect to exemplary embodiments thereof, the foregoing and various other additions and omissions may be made therein and thereto without departing from the spirit and scope of the present invention.

I claim:

1. An apparatus for detecting a shoulder load between two components in a drill string, comprising:

a pin connection having coupling means;

a box connection having corresponding coupling means for coupling to the pin connection to form a drill string; and a tension or compressive strain force sensing means arranged between the pin connection and the box connection, responsive to a compressive strain shoulder load force when the pin connection is coupled to the box connection, and further responsive to a light signal, for providing a compressive strain shoulder load force light signal containing information about a sensed compressive strain shoulder load force between the pin connection and the box connection in the drill string.

2. An apparatus according to claim 1, wherein the tension or compressive strain force sensing means includes:

a washer including a body having at least one bore with a wall surface;

at least one fiber optic Bragg Grating sensor being arranged inside said at least one bore; and means for bonding said at least one fiber optic Bragg Grating sensor inside a respective bore to the material of the wall surface of the washer so the compressive strain shoulder load force applied to the washer when the pin connection is coupled to the box connection is substantially transferred to said at least one fiber optic Bragg Grating sensor.

3. An apparatus according to claim 1, wherein said at least one fiber optic Bragg Grating sensor includes either a Bragg Grating point sensor, multiple Bragg Gratings, or a lasing element formed with pairs of multiple Bragg Gratings.

4. An apparatus according to claim 1,
wherein the pin connection has a shoulder surface for receiving the washer; and
wherein the box connection has a corresponding shoulder surface for receiving the washer.

5. An apparatus according to claim 1,
wherein the coupling means of the pin connection is threads; and
wherein the corresponding coupling means of the box connection is corresponding threads.

6. An apparatus according to claim 2,
wherein the washer is made of compressible material of suitable thickness such that it will not distort beyond a yield point when subjected to loading during drilling.

7. An apparatus according to claim 2,
wherein the body of the washer is drilled internally, without interconnecting the internal to external diameters, in a predetermined configuration to accommodate a desired number and placement of Bragg Gratings in a fiber optic filament.

8. An apparatus according to claim 7,
wherein the body of the washer can also accommodate a provision for a fiber optic connector to make the washer reusable.

9. An apparatus according to claim 3,
wherein the plurality of bores are drilled at predetermined positions within the body of the washer.

10. An apparatus according to claim 2,
wherein the apparatus includes a data acquisition unit having a broadband light source laser or laser diode with suitable photo optic couplers, demodulators and filtering equipment to monitor a Bragg Grating wavelength shift as the grating is subjected to strain.

11. An apparatus according to claim 2,
wherein said at least one fiber optic Bragg Grating sensor includes a plurality of fiber optic Bragg Grating sensors; and
wherein the apparatus includes wave division multiplexing means to discriminate a value or change in a wavelength of each of said plurality of fiber optic Bragg Grating sensors.

12. An apparatus according to claim 1,
wherein the apparatus includes an interferometric decoding means for detecting a change in a wavelength shift in the compressive strain shoulder load force light signal and converting the change into a phase shift for determining the compressive strain shoulder load force applied to the surface of the washer that is substantially transferred to the fiber optic Bragg Grating sensor when the pin connection is coupled to the box connection.

13. An apparatus according to claim 4, wherein the fiber optic Bragg Grating sensor is terminated within the body of the washer with a fiber optic interconnect.

14. An apparatus according to claim 1, wherein the tension or compressive strain force sensing means includes a direct strain readout box with a broadband laser or laser light source, and photodector measuring equipment to decode wavelength shifts and display the compressive strain shoulder load force.

15. An apparatus according to claim 8, wherein the direct strain readout box has a fiber optic lead which couples directly to a fiber protruding from the washer.

16. An apparatus according to claim 11, wherein the direct strain readout box has multiple leads for set-ups for displaying respective compressive strain shoulder load force on the plurality of the fiber optic Bragg Grating sensors.

17. An apparatus comprising:
a washer having at least one bore with a respective inner wall surface;
at least one fiber optic Bragg Grating sensor being arranged inside said at least one bore; and
means for bonding said at least one fiber optic Bragg Grating sensor inside a respective bore to the material of the respective inner wall surface of the washer so a load force applied to the surface of the washer is substantially transferred to the plurality of fiber optic Bragg Grating sensors.

18. An apparatus according to claim 17, wherein the means for bonding is an epoxy.

19. An apparatus according to claim 17,
wherein the washer is a ring washer having a planar surface; and
wherein the plurality of bores are oriented substantially parallel to the planar surface of the washer.

20. An apparatus according to claim 19,
wherein the ring washer has an outer cylindrical surface and an inner cylindrical surface; and
wherein each of the plurality of bores has two respective outer cylindrical surface openings and no inner cylindrical surface opening.

21. An apparatus according to claim 20,
wherein each of the plurality of bores has only one respective outer cylindrical surface opening.

22. An apparatus for detecting a shoulder load between two components in a section of a drill string, comprising:
a first component having coupling means;
a second component having corresponding coupling means for coupling to the first component to form a section of a drill string; and
a compressive strain coupling force sensing means arranged between the first component and the second component, responsive to a compressive strain coupling force when the first component is coupled to the second component, and further responsive to a light signal, for providing a compressive strain coupling force light signal containing information about a sensed compressive strain coupling force between the first component and the second component in the section of the drill string.

23. An apparatus according to claim 21,
wherein the compressive strain force sensing means includes:
a washer including a body having a plurality of bores each with a respective wall;
a plurality of fiber optic Bragg Grating sensors each arranged inside one of the plurality of the bores; and
means for bonding each of the plurality of the fiber optic Bragg Grating sensors inside a respective bore to the material of the respective wall of the washer so the compressive strain shoulder load force applied to the washer when the pin connection is coupled to the box connection is substantially transferred to each of the plurality of fiber optic Bragg Grating sensors.

24. An apparatus according to claim 23,
wherein each of the plurality of the fiber optic Bragg Grating sensors includes either a Bragg Grating point sensor, multiple Bragg Gratings, or a lasing element formed with pairs of multiple Bragg Gratings.

* * * * *

UNITED STATES PATENT AND TRADEMARK OFFICE
CERTIFICATE OF CORRECTION

PATENT NO : 5,973,317
DATED : October 26, 1999
INVENTOR(S): Hay

It is certified that error appears in the above-identified patent and that said Letters Patent is hereby corrected as shown below:

At column 4, line 31, delete ";22" and insert --22--.

Signed and Sealed this

Twenty-second Day of August, 2000

Attest:

Attesting Officer

Q. TODD DICKINSON

Director of Patents and Trademarks